United States Patent
Virtanen

(10) Patent No.: US 7,194,238 B2
(45) Date of Patent: Mar. 20, 2007

(54) IDENTIFICATION OF TERMINAL

(75) Inventor: Kati Virtanen, Tämpere (FI)

(73) Assignee: Nokia Corporation, Espoo (FI)

( * ) Notice: Subject to any disclaimer, the term of this patent is extended or adjusted under 35 U.S.C. 154(b) by 532 days.

(21) Appl. No.: 10/324,705

(22) Filed: Dec. 19, 2002

(65) Prior Publication Data

US 2003/0124978 A1 Jul. 3, 2003

(30) Foreign Application Priority Data

Dec. 20, 2001 (FI) .................................. 20012534

(51) Int. Cl.
*H04B 7/00* (2006.01)
(52) U.S. Cl. ........................ 455/41.2; 455/518; 455/519
(58) Field of Classification Search ................ 455/41.1, 455/41.2, 518, 519; 370/228, 255, 386
See application file for complete search history.

(56) References Cited

U.S. PATENT DOCUMENTS 6,901,057 B2 * 5/2005 Rune et al. .................. 370/310

FOREIGN PATENT DOCUMENTS

| EP | 1 056 029 | 11/2000 |
| WO | WO 00/42797 | 7/2000 |
| WO | WO 01/78325 | 10/2001 |
| WO | WO 200178325 A2 * | 10/2001 |

* cited by examiner

*Primary Examiner*—Edward F. Urban
*Assistant Examiner*—Raymond S. Dean
(74) *Attorney, Agent, or Firm*—Hollingsworth & Funk, LLC

(57) ABSTRACT

A method for identifying a terminal in a wireless data transmission system. The system comprises a first device, which comprises a first device-specific device identifier and a general device name, and a second device, which is configured to store name identifier in its memory. The first device identifier and the general device name are informed to the second device. A list of received device names is shown to the user in the second device. The second device is arranged to link device identifier to the name identifier stored in the memory. The first device identifier is compared with the device identifiers linked to the name identifiers in the second device and the name identifier linked to the device identifiers corresponding to the first device identifier is selected and shown in place of the device name on the list drawn up of the device names.

23 Claims, 4 Drawing Sheets

List of Devices Found:

* My phone
* My phone
* My phone
* Nokia 6210
* Hannu's laptop
? Unknown dvice

Fig. 5a

List of Devices Found:

* Olli Jansson
* My phone
* My phone
* Nokia 6210
* Hannu's laptop
? Unknown dvice

Fig. 5b

IDENTIFICATION OF TERMINAL

FIELD OF THE INVENTION

The invention relates to identification of a terminal in a system providing short-range wireless data transmission.

BACKGROUND OF THE INVENTION

As wireless technology becomes more and more common in communication between various electronic devices, user interface design faces new problems and challenges. The technology used, when a device communicates with and transfers data to other devices in a local area, is conventionally based on various cables. A widely used solution in short-range wireless data transmission is IrDA (Infrared Data Association) technology. IrDA is based on infrared transmission, whereby visual communication must be possible between the parties and so the distance is limited. Other short-range wireless data transmission technologies include e.g. Bluetooth, WLAN (IEEE 802.11 standard), BRAN (HiperLAN 1/2) and Home RF.

Bluetooth operates in the frequency range of 2.4 GHz, and currently, the Bluetooth range is a few tens of metres at normal power. One application area is to replace cables and the necessity of visual communication by Bluetooth technology in data transmission between devices, such as wireless mobile stations, portable computers, cameras and headphones. The Bluetooth solution is also used in home automation applications with limited visual communication. In both application areas it is likely that the environment comprises a plurality of Bluetooth devices, in addition to the desired one, with which a connection could be established. Identification of various devices poses a problem.

As a connection is established, the device transmits an inquiry to the environment, to which inquiry all attainable Bluetooth devices reply. The device replying to the inquiry always transmits in a feedback message its own device address (BD_ADDR), and in some cases, its name. The Bluetooth device address (BD_ADDR) is device-specific, and it is expressed in a hexadecimal form. The device name (Bluetooth name), in turn, is generally defined on the device level, for instance, as 'My phone' or 'Nokia 6210'. Because the hexadecimal Bluetooth address is not very illustrative to the user, the Bluetooth names of the devices that replied to the inquiry are informed to the user.

A problem with the above-described arrangement is a situation, where there are several similar devices in the environment. A plurality of devices then have the same device-level name, and a list of the devices in the environment provided to the user comprises several identical names. Hence, the user is not provided with sufficient information to be able to select the exactly right device, but in the worst case the user must go through all the alternatives appearing under the same name, in order to establish a connection to the desired device. For the user this is a slow and laborious solution and the requirements of good usability are not achieved thereby. Because Bluetooth is still relatively new technology, hardly any practical solutions to this problem have been implemented.

BRIEF DESCRIPTION OF THE INVENTION

The object of the invention is to provide a method and equipment implementing the method such that the above problems can be solved. This is achieved with a method, a device and a system, which are characterized by what is disclosed in the independent claims. The preferred embodiments of the invention are disclosed in the dependent claims.

The invention is based on identifying a device in a shortrange wireless data transmission system, for instance, by means of a device-specific device identifier and a general device name, which the device transmits when establishing a connection. The received device names constitute a list, which is displayed to the user. The received device identifier can be linked to the name identifier stored in a memory of a receiving device. If the received device identifier is linked to the name identifier, said name identifier is presented on the list of device names, instead of the device name.

The most basic name identifier (an electronic business card) comprises at least one field, the name. The business card can be extended to comprise a plurality of different fields. Most commonly, at least one telephone number is added to the business card, but there are several options for expansion. For instance, it is possible to add a plurality of telephone numbers, fax numbers, a postal address, a title, an e-mail address, URL or a text field (note). It is also possible to add an image or a personalized ringing tone to the business card. According to the invention, at least one device identifier field, e.g. a BT address field, can be added to the electronic business card.

An advantage with the method and the device of the invention is that the device is easier to use in the connection establishment. The method provides a user-friendly way to present the devices in the environment that are ready for the connection establishment and thus to facilitate the selection made by the user. By means of the method it is possible to eliminate connection establishments with wrong devices, and correspondingly, to expedite connection establishment with the right device.

BRIEF DESCRIPTION OF THE DRAWINGS

In the following the invention will be described in greater detail in connection with the preferred embodiments, with reference to the attached drawings, wherein

FIG. 5a is a user interface view showing a list of devices on the basis of information obtained from an inquiry made to the environment, in accordance with the prior art; and FIG. 5b is a user interface view showing a list of devices on the basis of information obtained from an inquiry made to the environment, in accordance with a preferred embodiment of the invention.

DETAILED DESCRIPTION OF THE INVENTION

In the following, the invention will be described, by way of example, applied to Bluetooth technology. However, it is apparent to a person skilled in the art that the invention is not restricted to said technology, but it can also be applied to other corresponding technologies, such as WLAN, BRAN and HomeRF, and to new short-range wireless data transmission systems to be developed in the future.

Figure 1:
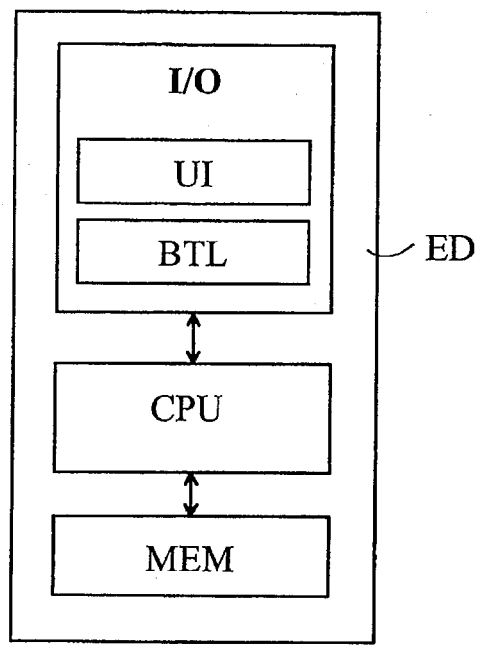
FIG. 1 is a block diagram of an electronic device according to one preferred embodiment of the invention.

FIG. 1 shows a block diagram of an electronic device (ED) according to one preferred embodiment of the invention, which device can be e.g. a wireless mobile station, a PDA (Personal Digital Assistant) device or a laptop computer.

The electronic device (ED) comprises a central unit (CPU), a memory (MEM) and an I/O system (I/O). All the necessary data is stored in the memory (MEM) of the device. The memory (MEM) comprises a read memory portion, which can be e.g. ROM memory, and a write memory portion, which can consist of e.g. RAM (Random Access Memory) and/or FLASH memory. The device communicates with other devices, the network and the user by means of the I/O system (I/O). A user interface (UI), which is part of the I/O system (I/O), comprises an interface necessary for communicating with the user, such as a display, a keypad, a loudspeaker and/or a microphone. Because the electronic device (ED) is provided with Bluetooth technology, the I/O system (I/O) also comprises a Bluetooth link (BTL). The data received from the different components of the device are conveyed to the central unit (CPU), which processes the data in the desired manner.

Figure 2:
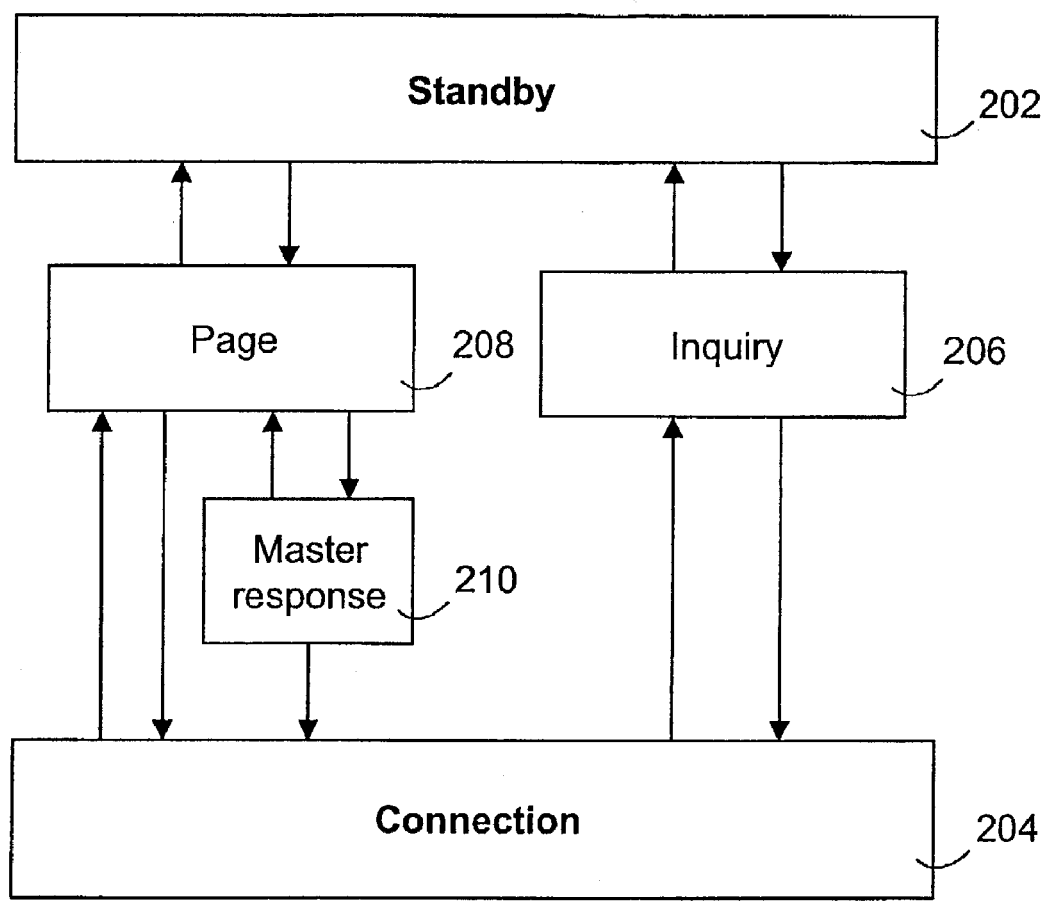
FIG. 2 illustrates basic states of a Bluetooth link (BTL) state machine in connection establishment.

FIG. 2 illustrates the basic states of a Bluetooth link (BTL) state machine in the connection establishment. The Bluetooth technology is based on master-slave architecture. A Bluetooth pico network consists of one master, which may have at least one and at most seven active slaves (possibly more in the future). It is also possible to change masters within the pico network.

The Bluetooth link can be either in a standby mode ('Standby') 202 or in an active mode ('Connection') 204. When a Bluetooth device is switched on, the link (BTL) automatically gets into the standby mode 202, which is at the same time a power saving mode. The device can establish a connection to a second device, i.e. get into the active mode 204, through various intermediate modes (such as 'Inquiry' 206, 'Page' 208 or 'Master response' 210). The employed intermediate mode depends on the role of the device, whether it desires to act as the master or a slave after establishing the connection, and whether the device is ready to receive messages or actively transmit them. The figure shows only some of the seven optional intermediate modes. In the active mode 204 the slave locks its reception to the master's clock and hopping sequence. In the active mode 204 the device can assume a plurality of different operating levels.

Figure 3:
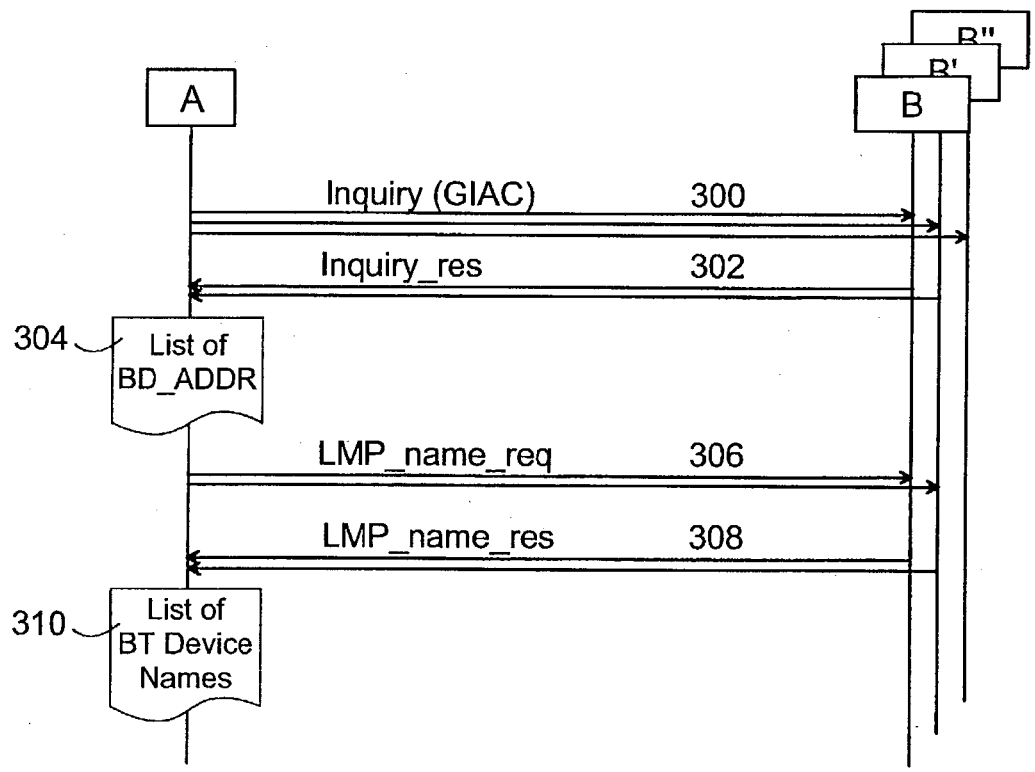
FIG. 3 illustrates an example of signalling between Bluetooth devices prior to the connection establishment.

FIG. 3 shows an example of signalling between two Bluetooth devices prior to the actual connection establishment. The Bluetooth device can be e.g. a wireless mobile station, a PDA device, a laptop computer, an accessory connectable thereto, such as a wireless headset or a printer.

Device A desires to establish a connection to device B and transmits an inquiry to the environment 300. The inquiry can be a 'General Inquiry' (GIAC), for instance. By GIAC the device can find out the devices in the environment, which are ready to establish a connection. The devices ready for connection (B and B') transmit in response an 'Inquiry_res' message 302. Correspondingly, device B" is not ready for connection establishment, and consequently it does not reply to the inquiry. In connection with the inquiry, device A, which sent out the inquiry, receives information on the addresses (BD_ADDR) and the clock of the other devices (B and B'). The device address is a device-specific identifier of the Bluetooth device and it is expressed in hexadecimal form, for instance, '000DF0BABE69' or '00:0D:F0:BA:BE:69'. The length of the Bluetooth address in the baseband layer is 48 bits, and correspondingly, in the UI layer 12 hexadecimal characters.

When device A has received responses from the devices (B and B') in the environment, it can draw up a list of the surrounding devices 304 by utilizing the device-specific Bluetooth addresses (BD_ADDR). Because BD_ADDR in the hexadecimal form is not obvious to the user, it is not useful to show the list directly in this form on the display. According to one preferred embodiment of the invention, at this stage, the device can browse through the BD_ADDRs stored in the memory and retrieve the personal data associated therewith. If the Bluetooth addresses of the devices (B and B') are not provided with name data, an 'LMP-_name_req' message 306 is transmitted to devices B and B'. This message inquires about the device's user-friendly name (BT name), by which the device can also present itself. The BT name is a character string, which can be e.g. 'My phone' or 'Nokia 6210'. At the maximum, it may comprise 248 characters, but depending on the characteristics and limitations, such as a small display, of the receiving device, only 20 first characters thereof may be used. The BT name is returned in connection with the 'LMP_name_res' message 308, in response to the 'LMP_name_req' inquiry 306 transmitted by device A. Thereafter, device A can create a list of devices (B and B') on the basis of the BT names and name data associated with the BD_ADDRs 310.

Depending on the technology used, a device-specific device identifier and a general device name may sometimes be identical, and in that case the device transmits only one identifier associated with the device in the call establishment.

Figure 4:
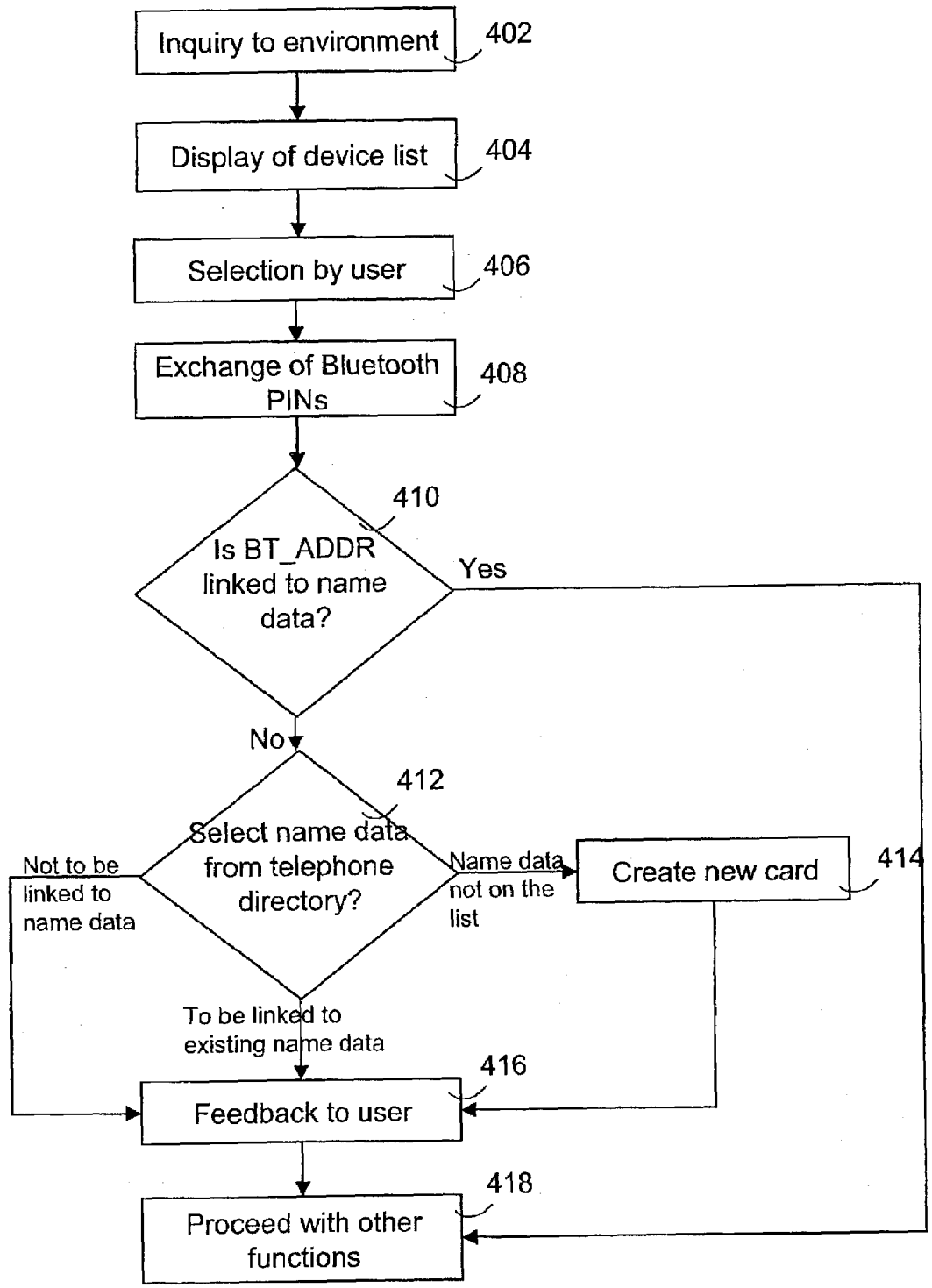
FIG. 4 is a flow chart of adding a Bluetooth address to the name data according to one preferred embodiment of the invention.

FIG. 4 illustrates, by means of a flow chart, how a Bluetooth address is added to the name data according to one preferred embodiment of the invention. Name data are stored in a memory (MEM) of an electronic device (ED), such as an electronic mobile station, in the same way as in a telephone directory. Thus, the telephone directory consists, at least partly, of name data, such as electronic business cards. At the minimum, the business card comprises a name field, and depending on the type and characteristics of the device, various fields, such as telephone number and address, can be added thereto. According to one preferred embodiment of the invention, it is also possible to add at least one Bluetooth address field to the business card.

The user activates the Bluetooth link and device A transmits an inquiry to the environment so as to establish a connection to a second Bluetooth device B 402. Signalling prior to connection establishment, by using the Bluetooth technology, has been described in connection with FIG. 3. After device A has found out the surrounding devices ready for connection establishment, it presents a list of alternative devices 404 to the user. Device A checks whether any of the found devices has a Bluetooth address linked to the name data. On the device list, a name field and a possible identifier of the name data are presented to the devices linked to the name data. The devices whose addresses are not linked to the name data are inquired about their Bluetooth names, and the obtained data are used for the device list. FIG. 5b shows an example of a user interface, where a device list drawn up in the above-described manner is displayed to the user.

From the list the user selects device B, with which the connection is to be established 406. To create a trusted connection the devices can exchange Bluetooth PINs 408, if there is no previous connection between the devices. On the user interface level, the Bluetooth PIN is known as 'Bluetooth Passkey'. PIN is employed to create a trusted connection between the devices. It can be stored in the memory of the device, or the user can be asked about it on the user interface level. The exchange of PINs is not obligatory, and its use depends on the case and the data to be transmitted. Thereafter, the actual connection can be established between device A and device B.

If the Bluetooth address of device B, with which the connection has been established, is already added to the name data 410, the process proceeds with the functions 418 desired by the user. If the device identifier of device B is not linked to the name data 410, the user is offered a possibility to link the Bluetooth address of device B to the name data in the telephone directory 412. The user is shown a list of the name data stored in the telephone directory. If the desired user data are already stored in the name data, the user selects them from the telephone directory list for the existing business card. Device A gives the necessary feedback on the selection to the user 416 and thereafter the linked Bluetooth address will also be indicated in connection with the name data. However, if the user does not desire to link device B data to any name data, the user can select to proceed without the linkage, e.g. by means of a menu command. The necessary feedback thereon 416 is also given to the user. A third alternative is that the user desires to link the device B data to the name data not previously stored in device A. In that case, it is possible for the user to create new name data 414, for instance by means of menu commands, to which name data the Bluetooth address of device B will be linked. Feedback thereon is also given to the user 416, and the name data will subsequently appear in the telephone directory. After the feedback given to the user, it is possible to proceed with the functions desired by the user 418. According to one preferred embodiment it is also possible to show in the name data a character, e.g. an icon, indicating the linked Bluetooth address.

When device A, which established the connection, is provided with a possibility to link the device identifier with the name data, correspondingly, device B, to which the connection was established, can be provided with a possibility to link the device data of device A with the name data. Advantageously, this can be implemented in the above-described manner (410 to 418).

According to one preferred embodiment of the invention, the user is provided with a possibility to add the Bluetooth address of his/her own device to the user data of said device automatically. The name identifiers are stored in the memory (MEM) of the device like in a telephone directory. The telephone directory comprises a name identifier also for the user's own data, so-called user data. The user of the device himself is able to enter the personal data, which include at least the user's name, in the user data. The user data, like the other name identifiers, may also comprise other data. According to the embodiment, the settings associated with the user data provide a possibility to associate the Bluetooth address (BD_ADDR) with the user data of one's own. After the user has activated this feature, for instance through the 'settings' menu, the device adds its own address (BD_ADDR) to be one field in the user data. So, when the user transmits his business card (user data) to a second device, the Bluetooth address (BD_ADDR) accompanies the card.

FIGS. 5a and 5b show a list of devices, which is displayed to the user on the basis of the information received from the inquiry made in the environment. FIG. 5a shows a list, where the devices are presented by means of the Bluetooth names (BT name). When there are a plurality of similar devices in the environment, the list comprises several identical BT names. In that case the user does not necessarily know which device on the list is the one to which (s)he would like to establish a connection. FIG. 5b shows a corresponding list according to one preferred embodiment of the invention. The device data of some devices in the vicinity have been stored in advance in connection with the name identifier, and these data are utilized in drawing up the list. The list shows some of the devices by the name field of the name identifier.

For instance, the user desires to establish a connection to the mobile station of Olli Jansson. The Bluetooth name of Olli's mobile station is 'My Phone'. In FIG. 5a, Olli's mobile phone appears on the list as 'My phone' among the devices with the same name. From the three 'My phone' alternatives the user cannot select for certain the telephone of Olli Jansson. In FIG. 5b, the user has previously linked the device data of Olli's mobile station, the Bluetooth address, to his name data, and, in place of 'My Phone', the list shows Olli Jansson, which was picked up from the name field of Olli's business card. The user is now immediately able to select the correct mobile station from the list, and the connection will be established with the correct device. This enables faster connection establishment with fewer errors.

According to one preferred embodiment of the invention, the BT address linked to the name identifier (e.g. electronic business card) behaves in a corresponding manner as the other fields of the business card. So, when the user forwards a business card (own user data or a business card of another user in his/her telephone directory), it will be accompanied by the BT address. The user can be provided with a possibility to decide on the number and selection of the fields, for instance through the transmission settings menu. Thus, the BT address field is only transmitted when the user has so defined in the settings.

There are situations, where the user desires to link the device identifiers of a plurality of various devices to one name identifier (e.g. electronic business card). This situation arises, for instance, when a person (e.g. Olli Jansson) has a mobile station, a headset to be used therewith and a laptop computer. The user does not desire to create several business cards in the name of Olli Jansson but prefers to link all identifiers of the devices in his possession under one single name. One preferred embodiment of the invention enables linkage of a plurality of BT address fields to one business card. Thus, it is advantageous to provide the user with a possibility to enter in the fields an additional identifier, by which the different Bluetooth devices of a given user can be distinguished, for instance, 'GSM', 'laptop' or 'headset'. The additional identifier can be represented either as a text or as an image, for instance, by means of an icon. When the additional identifier is used, the device list shows an additional qualifier linked to the field, in addition to the name data, which further facilitates the identification of the device. Textual and iconic representations can be used together, whereby a textual additional qualifier is of particular assistance when one user has a plurality of devices of the same category (e.g. mobile telephone) at his/her disposal. When icons are used, it is easier to distinguish between the devices of different types, but when the same person has several mobile telephones, all the telephones show the same icon. In that case, an additional textual qualifier, which is added to the field and by which the distinction between the telephones (work, home, cottage, etc.) can be made, facilitates the connection establishment.

It is apparent to the person skilled in the art that as technology progresses the basic idea of the invention can be implemented in a variety of ways. Thus, the invention and its embodiments are not restricted to the above-described examples but they may vary within the scope of the claims.

The invention claimed is:

1. A method for identifying a terminal in a short-range wireless data transmission system comprising at least a first device and a second device, wherein at least said first device comprises a device-specific first device identifier and a general device name, the method comprising:
   storing, in a memory of said second device, at least one name identifier;
   receiving information, by said second device, regarding the device-specific first device identifier and the general device name of said first device;
   showing a list of received device names to a user of said second device including the general device name of said first device;
   offering to the user of said second device a possibility to amend the shown general device name of said first device into the at least one stored name identifier by linking said device-specific first identifier to the at least one name identifier stored in the memory of said second device; and
   if the user wishes to link the device-specific first device identifier to the at least one name identifier, linking the device-specific first device identifier to the at least one name identifier stored in the memory of said second device for enabling said second device to show the at least one stored name identifier linked with the device-specific first identifier upon subsequent reception of information regarding said device-specific first identifier.

2. The method of claim 1, wherein
   the first device informs the second device of said first device identifier and said general device name in response to the device inquiry made by said second device.

3. The method of claim 1, wherein
   in response to connection establishment to said first device, whose device identifier is not linked to the name identifier stored in the memory,
   linking said first device-specific device identifier in said second device to the existing name identifier; or
   creating a new name identifier, to which said first device identifier is linked.

4. The method of claim 1, wherein
   the wireless data transmission technology employed is Bluetooth, and
   the device-specific device identifiers are Bluetooth addresses (BD_ADDR) and said Bluetooth address is transmitted when a Bluetooth connection is established.

5. The method of claim 1, wherein
   said second device comprises a second device-specific device identifier, which can be linked to the name identifier of the user of said second device, stored in the memory of said second device.

6. The method of claim 1, further comprising
   transmitting a device identifier linked to at least one name identifier in connection with the name identifier transmission.

7. The method of claim 1, wherein
   said first device identifier and said general device name are identical.

8. An electronic device comprising means for arranging short-range wireless data transmission, the device comprising at least one name identifier in its memory, and is configured
   to receive a first device-specific device identifier and a general device name from a second wireless device;
   to show a list of received device names to a user of said electronic device including the general device name from the second wireless device;
   to offer to the user a possibility to amend the shown general device name of the second wireless device into the at least one stored name identifier by linking said first device-specific device identifier to the at least one name identifier stored in the memory; and
   to link the first device-specific device identifier to the at least one stored name identifier for enabling said electronic device to show the at least one stored name identifier linked with the first device-specific device identifier upon subsequent reception of information regarding said first device-specific device identifier if the user wishes to link the first device-specific device identifier to the at least one name identifier.

9. The electronic device of claim 8, wherein
   the device is configured to receive said first device-specific device identifier and general device name from said second device in response to the device inquiry made by the device.

10. The electronic device of claim 8, wherein
    in response to the connection establishment to said second device, whose device identifier is not linked to the name identifier stored in the memory,
    the device is configured to link said first device-specific device identifier of said second device to the existing name identifier; or
    the device is configured to create a new name identifier, to which said first device-specific device identifier is configured to be linked.

11. The electronic device of claim 8, wherein
    the wireless data transmission technology employed is Bluetooth technology;
    the device-specific device identifiers are Bluetooth addresses (BD_ADDR); and
    the device is configured to receive said Bluetooth address when the Bluetooth connection is established.

12. The electronic device of claim 8, wherein
    the device comprises a second device identifier that identifies said device device-specifically; and
    the device is configured to link said second device identifier to the name identifier stored in the memory and identifying the user of the device.

13. The electronic device of claim 8, wherein
    the device is configured to transmit a device identifier linked to at least one name identifier in connection with transmitting the name identifier.

14. The electronic device of claim 8, wherein
    said first device identifier and said general device name are identical.

15. A short-range wireless telecommunication system comprising at least a first device and a second device,
    wherein at least said first device comprises a first device-specific device identifier and a general device name, and is configured to
    transmit said first device identifier and said general device name to said second device;
    wherein at least said second device includes at least one name identifier in its memory and is configured to
    receive information regarding the first device-specific device identifier and the general device name of said first device, show a list of received device names to a user of the second device including the general device name of said first device, offer to the user of the second device a possibility to amend the shown general device name of said first device into the at least one stored name identifier by linking said first device-specific device identifier to the at least one name identifier in the memory of the second device, and if the user wishes to link the first device-specific device identifier to the at least one name identifier, link the first device-specific device identifier to the at least one name identifier stored in the memory of said second device for enabling said second device to show the at least one stored name identifier linked with the first device-specific device identifier upon subsequent reception of information regarding said first device-specific device identifier.

16. The telecommunication system of claim 15, wherein the first device is configured to inform the second device of said first device identifier and said first general device name in response to the device inquiry made by said second device.

17. The telecommunication system of claim 15, wherein the wireless data transmission technology employed is the Bluetooth technology;

the device-specific device identifiers are Bluetooth addresses (BD_ADDR); and said first device is configured to transmit the Bluetooth address when the Bluetooth connection is established.

18. The telecommunication system of claim 15, wherein said first device identifier and said general device name are identical.

19. The method of claim 1, further comprising:

comparing said first device identifier with the device identifiers linked to the name identifiers in said second device; and if the user of said second device opted to link said first device identifier to said name identifier in response to the offer, selecting the name identifier linked to the device identifier corresponding to said first device identifier, and showing it on said list instead of the device name.

20. The method of claim 1, further comprising:

showing a linked general device name of said first device to a user of said second device in response to receiving information, by said second device, regarding the device-specific first device identifier and the general device name of said first device.

21. The electronic device of claim 8, wherein the device is further configured to show a linked general device name of said first device to a user of said second device in response to receiving information, by said second device, regarding the device-specific first device identifier and the general device name of said first device.

22. The system of claim 15, wherein the second device is further configured to show a linked general device name of said first device to a user of said second device in response to receiving information, by said second device, regarding the device-specific first device identifier and the general device name of said first device.

23. An electronic device configured with a communication technology for arranging short-range wireless data transmission, the device further comprising:

a memory for storing at least one name identifier;

an input/output system for receiving information regarding a device-specific first device identifier and a general device name of another device;

a display for showing a list of received device names to a user of said device including the general device name of said another device;

a user interface for offering to the user of said device a possibility to amend the shown general device name of said another device into the at least one stored name identifier by linking said device-specific first device identifier to the at least one name identifier stored in the memory of said device; and a processor for linking the device-specific first device identifier to the at least one name identifier stored in the memory for enabling said display to show the at least one stored name identifier linked with the device-specific first device identifier upon subsequent reception of information regarding said device-specific first device identifier if the user wishes to link the device-specific first device identifier to the at least one name identifier.

* * * * *